(12) United States Patent
Marinus et al.

(10) Patent No.: US 10,355,340 B2
(45) Date of Patent: Jul. 16, 2019

(54) SOLID-STATE LIGHTING DEVICE HAVING A WIRELESS COMMUNICATION ANTENNA

(71) Applicant: SIGNIFY HOLDING B.V., Eindhoven (NL)

(72) Inventors: Antonius Adrianus Maria Marinus, Eindhoven (NL); Yacouba Louh, Eindhoven (NL); Jin Ding, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 11 days.

(21) Appl. No.: 15/605,382

(22) Filed: May 25, 2017

(65) Prior Publication Data

US 2017/0352942 A1 Dec. 7, 2017

(30) Foreign Application Priority Data

Jun. 7, 2016 (EP) .................................... 16173258

(51) Int. Cl.
*H01Q 1/24* (2006.01)
*F21K 9/232* (2016.01)
(Continued)

(52) U.S. Cl.
CPC .............. *H01Q 1/24* (2013.01); *F21K 9/232* (2016.08); *F21K 9/61* (2016.08); *F21V 23/045* (2013.01);
(Continued)

(58) Field of Classification Search
CPC ... H01Q 1/24; H01Q 1/06; H01Q 1/44; F21Y 2115/10; G02B 6/0021; G02B 6/0036;
(Continued)

(56) References Cited

U.S. PATENT DOCUMENTS 5,424,859 A * 6/1995 Uehara ..................... H04B 1/38
398/126
6,039,459 A * 3/2000 Chang ................. F21V 19/0065
362/253
(Continued)

FOREIGN PATENT DOCUMENTS

GB 2483113 A 2/2012
JP 2016100125 A 5/2016
(Continued)

*Primary Examiner* — Dameon E Levi
*Assistant Examiner* — Ab Salam Alkassim, Jr.
(74) *Attorney, Agent, or Firm* — Akarsh P. Belagodu

(57) ABSTRACT

A lighting device is disclosed. The lighting device comprises: a solid-state lighting element; a radio frequency communication unit for wireless communication between the lighting device and an external device; a light guide having a circumferential edge, wherein the light guide is adapted to couple in light emitted by the solid-state lighting element and to provide illumination to the surroundings of the lighting device; and a metal strip extending along at least a portion of the circumferential edge of the light guide, wherein the metal strip is in thermal contact with the solid-state lighting element and the light guide, and wherein the metal strip is coupled to the radio frequency communication unit so as to operate as an antenna for the radio frequency communication unit.

14 Claims, 3 Drawing Sheets

(51) Int. Cl.
| | |
|---|---|
| *F21V 8/00* | (2006.01) |
| *H04B 1/38* | (2015.01) |
| *F21V 23/04* | (2006.01) |
| *F21K 9/61* | (2016.01) |
| *H05B 37/02* | (2006.01) |
| *F21V 29/71* | (2015.01) |
| *F21Y 115/10* | (2016.01) |

(52) U.S. Cl.
CPC ......... *G02B 6/0083* (2013.01); *G02B 6/0085* (2013.01); *H04B 1/38* (2013.01); *F21V 29/713* (2015.01); *F21Y 2115/10* (2016.08); *G02B 6/0021* (2013.01); *G02B 6/0036* (2013.01); *H05B 37/0272* (2013.01)

(58) Field of Classification Search
CPC ....... G02B 6/0083; G02B 6/0085; F21K 9/61; F21K 9/232; H04B 1/38
USPC .......................................................... 343/721
See application file for complete search history.

(56) References Cited

U.S. PATENT DOCUMENTS

| | | | | |
|---|---|---|---|---|
| 6,438,391 | B1* | 8/2002 | Wang | H01Q 1/06 343/701 |
| 6,614,126 | B1* | 9/2003 | Mitchell | H04B 10/1149 307/9.1 |
| 6,646,613 | B1* | 11/2003 | Cheng | H01Q 1/06 343/713 |
| 6,957,043 | B2* | 10/2005 | Angermann | G01S 1/68 340/12.32 |
| 7,116,279 | B1* | 10/2006 | Chan | H01Q 1/06 343/721 |
| 7,162,258 | B2* | 1/2007 | Beach | H05B 37/0272 370/217 |
| 7,247,994 | B2* | 7/2007 | Roach, Jr. | H05B 37/0272 315/149 |
| 7,714,699 | B2* | 5/2010 | Wessels | H05B 37/0272 315/149 |
| 8,254,790 | B2* | 8/2012 | Okano | H04B 10/116 398/172 |
| 8,750,671 | B1 | 6/2014 | Kelly et al. | |
| 9,693,432 | B2* | 6/2017 | Ando | F21S 8/026 |
| 9,846,795 | B2* | 12/2017 | Russell | F21V 23/0471 |
| 9,930,758 | B2* | 3/2018 | Jayawardena | H05B 37/0272 |
| 2007/0008234 | A1* | 1/2007 | Capps | H01Q 1/3291 343/721 |
| 2007/0109763 | A1* | 5/2007 | Wolf | A01M 1/2083 362/86 |
| 2007/0109782 | A1* | 5/2007 | Wolf | A01M 1/2083 362/253 |
| 2009/0196016 | A1* | 8/2009 | Massara | F21V 23/0471 362/86 |
| 2010/0188301 | A1* | 7/2010 | Kishimoto | G08G 1/095 343/721 |
| 2010/0207501 | A1* | 8/2010 | Radermacher | F21K 9/233 313/46 |
| 2012/0086345 | A1* | 4/2012 | Tran | H05B 33/0845 315/158 |
| 2012/0169235 | A1 | 7/2012 | Dassanayake et al. | |
| 2012/0242466 | A1* | 9/2012 | Stillfried | B60Q 1/2611 340/425.5 |
| 2012/0293652 | A1* | 11/2012 | Farmer | F21V 19/045 348/143 |
| 2013/0063042 | A1* | 3/2013 | Bora | H05B 33/0863 315/292 |
| 2013/0063317 | A1* | 3/2013 | Jonsson | H01Q 1/44 343/721 |
| 2013/0155664 | A1* | 6/2013 | Kim | F21L 4/02 362/184 |
| 2013/0181607 | A1* | 7/2013 | Yotsumoto | H05B 37/0272 315/70 |
| 2013/0249392 | A1* | 9/2013 | Kim | F21V 23/009 315/34 |
| 2013/0285544 | A1* | 10/2013 | Molezion | H01C 21/007 315/34 |
| 2014/0063847 | A1 | 3/2014 | Sakamoto et al. | |
| 2014/0168020 | A1* | 6/2014 | Stoytchev | F21V 33/0004 343/721 |
| 2014/0252958 | A1* | 9/2014 | Subotnick | H05B 37/0218 315/149 |
| 2014/0273892 | A1* | 9/2014 | Nourbakhsh | H04B 1/3827 455/90.3 |
| 2015/0070895 | A1* | 3/2015 | Yotsumoto | H04R 1/028 362/253 |
| 2015/0103515 | A1* | 4/2015 | Bosua | F21V 29/83 362/157 |
| 2015/0109781 | A1* | 4/2015 | Van Der Merwe | F21V 23/0435 362/249.01 |
| 2015/0270597 | A1* | 9/2015 | Kough | H01Q 1/06 343/721 |
| 2015/0280316 | A1* | 10/2015 | Iso | H01Q 1/06 343/713 |
| 2015/0292686 | A1* | 10/2015 | Negley | F21V 3/0625 315/34 |
| 2015/0345764 | A1* | 12/2015 | Hussey | F21V 23/006 362/235 |
| 2016/0003417 | A1* | 1/2016 | Bukkems | F21V 29/507 362/236 |
| 2016/0041324 | A1* | 2/2016 | Nava | G02B 6/0001 362/311.01 |
| 2016/0183353 | A1* | 6/2016 | Louh | H05B 37/0272 315/291 |
| 2016/0230978 | A1* | 8/2016 | Kato | F21V 29/83 |
| 2016/0323956 | A1* | 11/2016 | Mathews | H05B 33/0854 |
| 2016/0323983 | A1* | 11/2016 | Yotsumoto | H04R 1/028 |
| 2017/0059095 | A1* | 3/2017 | Van Bommel | H05B 37/0272 |
| 2017/0142812 | A1* | 5/2017 | Creemers | F21V 29/70 |
| 2018/0087759 | A1* | 3/2018 | Mathews | F21V 23/045 |
| 2018/0135819 | A1* | 5/2018 | Grandadam | F21K 9/232 |
| 2019/0056072 | A1* | 2/2019 | Gielen | F21V 23/003 |

FOREIGN PATENT DOCUMENTS

| | | |
|---|---|---|
| JP | 2016514353 A | 5/2016 |
| WO | WO 2014087357 A1 * 6/2014 ........... H05K 1/0209 |
| WO | WO2015014564 A1 | 2/2015 |

* cited by examiner

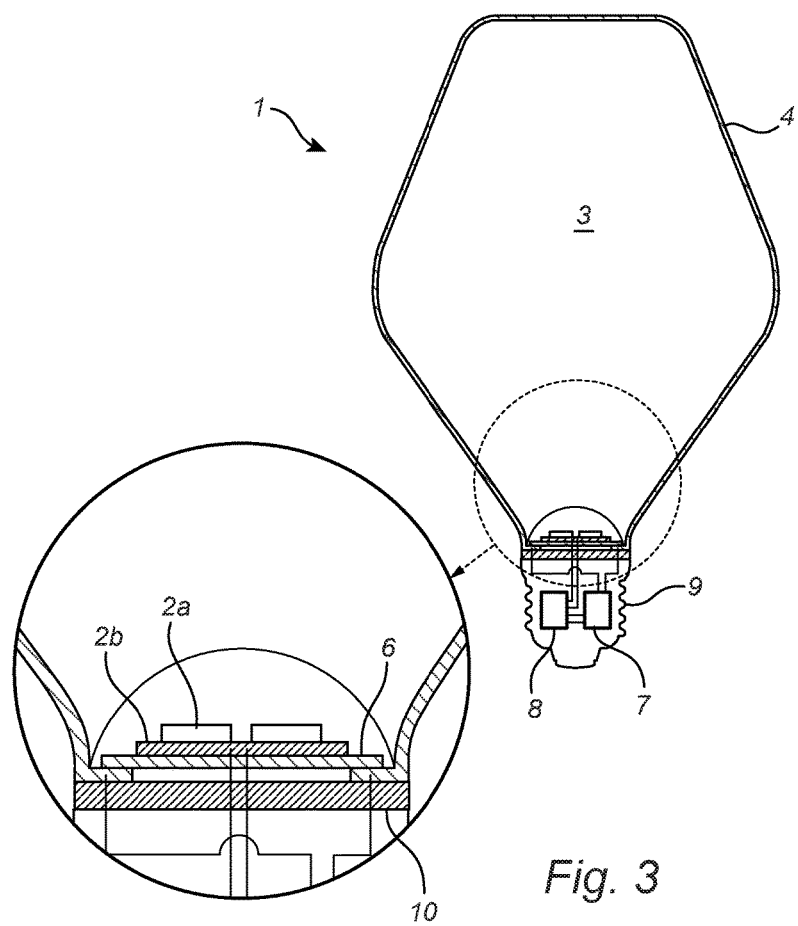
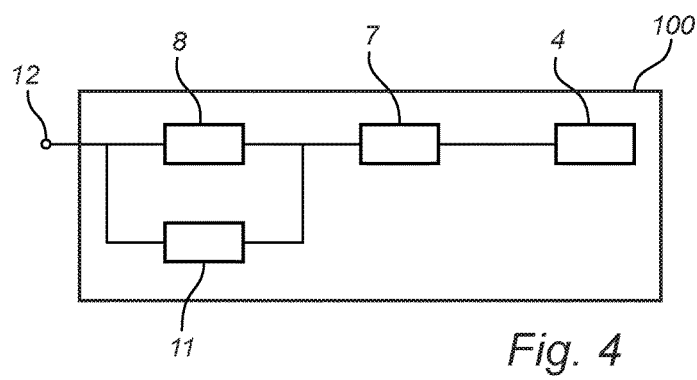

SOLID-STATE LIGHTING DEVICE HAVING A WIRELESS COMMUNICATION ANTENNA

TECHNICAL FIELD

The present invention relates to a solid-state lighting (SSL) device equipped with an antenna for wireless communication.

BACKGROUND

Lighting devices that are wirelessly controllable are known in the art. An example of such a lighting device is the light bulb disclosed in US 2014/0273892 A1 which has a transceiver that uses the heat sink for the light-emitting diodes (LEDs) as its antenna. Radio-frequency signals may be used to switch the power on/off, adjust the illumination intensity, change the lighting color or control the operation of the light bulb in some other way.

Having one component perform several functions may lower production costs and simplify the production process since the number of components is reduced, but this type of functional integration is not without technical challenges. This is particularly true for the antenna function since the design and position of the antenna greatly affect its technical performance. There is a need to find improved ways of integrating antennas with other lighting device components.

SUMMARY

In view of the foregoing, and according to an aspect of the present invention, there is provided a lighting device comprising: an SSL element; a radio frequency (RF) communication unit for wireless communication between the lighting device and an external device; a light guide having a circumferential edge, wherein the light guide is adapted to couple in light emitted by the SSL element and to provide illumination to the surroundings of the lighting device; and a metal strip extending along at least a portion of the circumferential edge of the light guide, wherein the metal strip is in thermal contact with the SSL element and the light guide; and wherein the metal strip is coupled to the radio frequency communication unit so as to operate as an antenna for the radio frequency communication unit.

The metal strip being positioned on the circumference of the light guide means that it may effectively transfer heat away from the SSL element to the surrounding air and to the light guide which also helps to transfer heat away from the SSL element. So positioning the metal strip in this way helps to improve the thermal management of the lighting device. The metal strip is also suitably positioned for efficient signal reception and/or transmission since other components of the lighting device are unlikely to block the antenna or interfere with it in a way that prevents it from operating optimally. Moreover, the position of the metal strip is such that it blocks little of the light emitted from the light guide. Positioning the metal strip in this way thus helps to create an omnidirectional light distribution.

According to one example embodiment, the radio frequency communication unit is a transceiver. A transceiver is a versatile type of communication unit since it is capable of both sending and receiving signals. Alternatively, however, the radio frequency communication unit can be simply a sender or a receiver.

According to one example embodiment, the metal strip is adapted to operate as an antenna for radiofrequency signals in the range from 2.4 Ghz to 2.5 Ghz, for example from 2.40 Ghz to 2.48 Ghz. These frequencies are particularly suitable for many wireless applications, such as those where the lighting device should be controllable by means of gateways supporting ZigBee, Bluetooth or WiFi wireless protocols. The antenna length affects which frequencies the antenna is particularly sensitive to and is determined by the positions where the radio frequency communication unit is connected to the metal strip. The antenna length is usually approximately equal to an integer multiple of $\lambda/4$, where $\lambda$ is the wavelength of a signal that the antenna is configured to receive or send.

According to one example embodiment, a side of the metal strip facing the light guide is reflective. Such a reflective metal strip helps to reduce losses that may occur when light traveling within the light guide strikes the interface between the light guide and the metal strip by reflecting light back into the light guide.

According to one example embodiment, the metal strip is perforated. The perforations allow for light to be emitted therethrough, thus rendering the light output of the lighting device more spatially uniform. Differently stated, the perforations help to create an omnidirectional light distribution.

According to one example embodiment, the light guide has two oppositely arranged planar outer surfaces, the circumferential edge joining the respective circumferences of the two planar outer surfaces. Such a light guide can have a large light-emitting outer surface area, and this helps to create a uniform light distribution. Moreover, the thermal management of the lighting device is improved because a large outer surface area promotes efficient dissipation of the heat generated by the SSL element.

According to one example embodiment, the light guide is adapted to diffuse light emitted from the light guide. Such a light-guide is suitable for applications where a spatially uniform light output is required.

According to one example embodiment, the lighting device further comprises a first electrically isolating plate arranged between the SSL element and the metal strip so as to electrically isolate the SSL element from the metal strip. From a manufacturing perspective, this is a relatively simple and inexpensive way of electrically isolating the metal strip from the SSL element while maintaining a good thermal contact between the metal strip and the SSL element.

According to one example embodiment, the lighting device further comprises a base for mechanically and electrically connecting the lighting device.

According to one example embodiment of the lighting device, the lighting device further comprises a second electrically isolating plate arranged between the base and the metal strip so as to electrically isolate the base from the metal strip. From a manufacturing perspective, this is a simple and inexpensive way of electrically isolating the metal strip from the base.

According to one example embodiment, the radio frequency communication unit is arranged inside the base. By arranging the radio frequency communication unit inside the base it is possible to make the lighting device compact.

According to one example embodiment, the lighting device further comprises a driver for powering the SSL element, wherein the driver is arranged inside the base. By arranging the driver inside the base, it is possible to make the lighting device compact.

According to one example embodiment, the lighting device further comprises an additional communication unit for wired communication between the lighting device and an external device. i.e. via a wired connection. This makes the lighting device more versatile since the wired connection may be used if there are wireless communication problems, such as poor signal reception. Furthermore, this external device may be the same as the aforementioned external device, or it may be a different external device.

According to one example embodiment, the SSL element comprises at least one LED mounted on a circuit board, and the metal strip is integrated with the circuit board.

It is noted that the invention relates to all possible combinations of features recited in the claims.

BRIEF DESCRIPTION OF THE DRAWINGS

This and other aspects of the present invention will now be described in more detail, with reference to the appended drawings in which:

FIG. 3 is a cross-sectional side view of the lighting device in FIG. 1 with an inset showing an enlarged portion of the lighting device;

FIG. 4 shows a schematic block diagram of a lighting device according to a second embodiment of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION OF THE DRAWINGS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
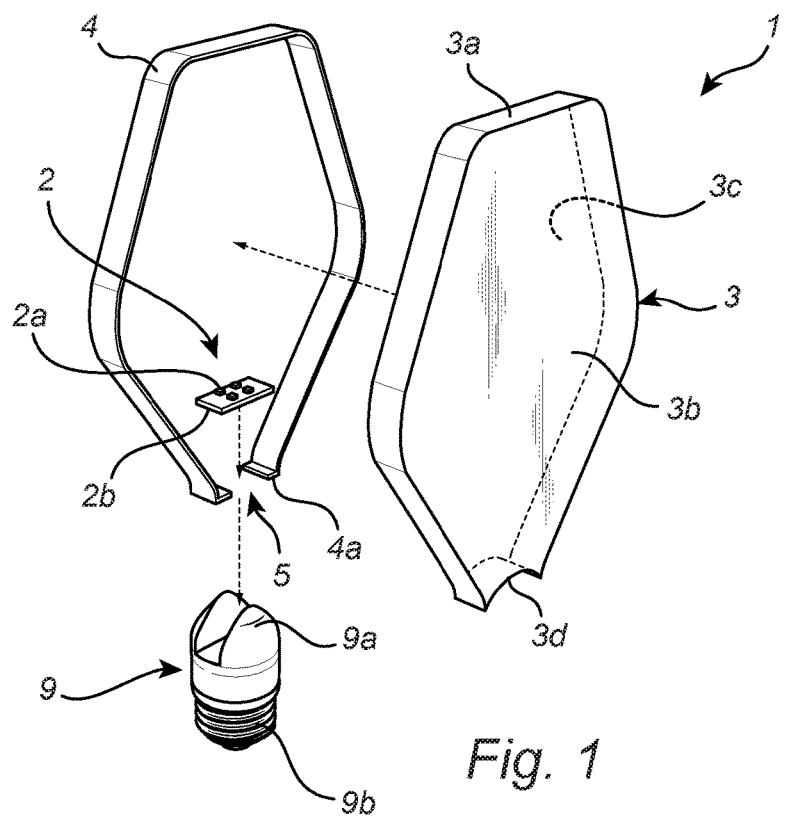
FIG. 1 is an exploded view of a lighting device according to a first embodiment of the invention.
Figure 2:
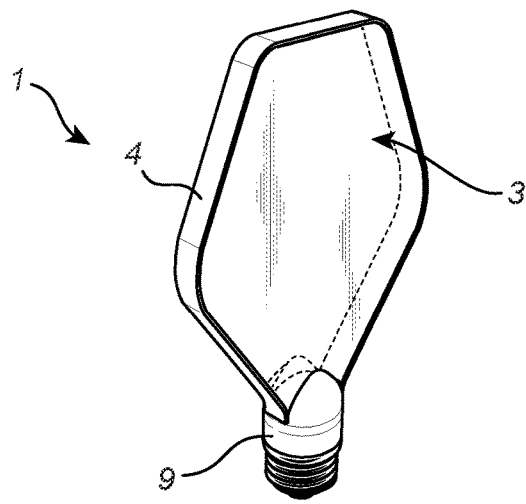
FIG. 2 is a perspective view of the lighting device in FIG. 1.

FIGS. 1 to 3 show an example of lighting device 1 in the form of a light bulb. The light source of the lighting device 1 is an SSL element 2. In this example the SSL element 2 comprises several LEDs 2a mounted on a circuit board 2b. The circuit board 2b is a printed circuit board, but other types of circuit boards, such as wired circuit boards, are conceivable. The LEDs 2a may for example be semiconductor LEDs, organic LEDs or polymer LEDs. All of the LEDs 2a may be configured to emit light of the same color, for example white light, or different LEDs may be configured to emit light of different colors. It should be noted that in other examples SSL element 2 may have only one LED 2a.

A light guide 3 is arranged to couple in light emitted by the SSL element 2. The shape of the light guide 3 is generally flat. The light guide 3 has an outer circumferential edge 3a that joins two planar outer surfaces 3b, 3c which are arranged opposite to each other and which serve as light-emitting surfaces. The outer surfaces 3b, 3c may be adapted to scatter or diffuse light leaving the light guide 3, for example by being provided with a textured surface pattern of projections and recesses. The SSL element 2 is positioned in a depression 3d of the circumferential edge 3a. Further, the light guide 3 is thermally conductive and adapted to operate as a heat sink for the SSL element 2. Examples of suitable materials for the light guide 3 include glass and transparent or translucent plastic materials such as polymethyl methacrylate (PMMA) and polycarbonate (PC). The thickness of the light guide 3 may for example be in the range 6 mm to 15 mm.

The lighting device 1 further comprises a metal strip 4 arranged on the outer surface of the light guide 3, more precisely on a portion of the circumferential edge 3a. The metal strip 4 can for example be made of aluminium. The length of metal strip may for example be approximately 20 cm. The width of the metal strip 4 is typically in the range 1 mm to 4 mm. The side of the metal strip 4 that faces the light guide 3 is provided with a reflective coating, although this may or may not be the case in other examples. The reflective coating may for example be white paint. An example of a suitable reflective coating is Nanoflex®. Further, in other examples, the metal strip 4 may be perforated with holes.

The metal strip 4 follows the contour of the light guide 3 without forming a closed loop. Thus, the metal strip 4 may be referred to as open. Two ends 4a of the metal strip 4 are arranged on either side of the depression 3d so that an opening 5, or gap, is formed in level with the depression 3d and the SSL element 2. The metal strip 4 is in thermal contact with the SSL element 2 so as to operate as a heat sink for the SSL element 2. The metal strip 4 is thus capable of transferring heat away from the SSL element 2 to the ambient air, and also to the light guide 3 which is in thermal contact with the metal strip 4. Further, the metal strip 4 and the SSL element 2 are electrically isolated from each other by means of a first electrically isolating plate 6 sandwiched therebetween. The first electrically isolating plate 6 extends from one end of the metal strip 4 to the other end, over the depression 3d in the circumferential edge 3. The ends of the metal strip 4 and the circuit board 2b are attached to a respective side of the first electrically isolating plate 6. The first electrically isolating plate 6 may be a ceramic plate having a very high thermal conductivity and a very low electrical conductivity. The thickness of the first isolating plate 6 may for example be approximately 2 mm.

A radio frequency (RF) communication unit 7 in the form of a radio frequency transceiver is capacitively coupled to the metal strip 4. The RF communication unit 7 may be connected to the metal strip 4 via caps (DC blocking capacitors). The RF communication unit 7 is configured to communicate with an external device by wireless radiofrequency signals via the metal strip 4. Hence, the metal strip 4 is adapted to act as an antenna. The RF communication unit 7 may be connected to the metal strip 4 at various position depending on the required length of the antenna. The external device (not shown) may for example be a mobile phone or a remote control. Further, the RF communication unit 7 is electrically connected to a driver 8 configured to power the SSL element 2. The driver 8 and the SSL element 2 are controllable by the RF communication unit 7. The total current generated by the driver 8 to power the SSL element 2 is controlled by the RF communication unit 7.

The driver 8 and the RF communication unit 7 are both arranged inside a base 9 for mechanically and electrically connecting the lighting device 1. The base 9 has a first portion 9a which is proximal to the light guide 3. The first portion 9a has two protruding side walls that prevent light emitted by the SSL element 2 from escaping sideways before entering the light guide 3. The base 9 has a second portion 9b which is distal to the light guide 3. The second portion 9b is threaded for screwing into a lamp socket. In other examples, the base 9 may, in addition to or as an alternative to the threaded second portion 9b, be provided with some other type of electrical and/or mechanical interface, such as a bayonet mount or a USB connection. A second electrically isolating plate 10 is arranged between the base 9 and the metal strip 4. The two ends of the metal strip 4 are sandwiched between the first and second electrically isolating plates 6, 10. Like the first electrically isolating plate 6, the second electrically isolating plate 10 may be a ceramic plate. The thickness of the second electrically isolating plate 10 may for example be approximately 2 mm.

The lighting device 1 is put in operation by connecting the base 9 to an electrical power supply, such as the mains power grid, whereby the driver 8 supplies power to the SSL element 2. The SSL element 2 emits light that is coupled into the light guide 3. The in-coupled light travels through the light guide 3 by total internal reflection until it is coupled out through one of the two outer surfaces 3a, 3b and illuminates the surroundings of the lighting device 1. The metal strip 4 transfers heat generated by the SSL element 2 to the ambient air. Some of the heat absorbed by the metal strip 4 is transferred to the light guide 3 and then to the ambient air through, primarily, the two outer surfaces 3c, 3d. Some of the heat generated by the SSL element 2 is absorbed directly by the light guide 3 and then dissipated to the ambient air. The mechanisms by which heat is dissipated from the light guide 3 and the metal strip 4 are convection and thermal radiation. The aforementioned external device (i.e. a mobile phone or a remote control, for example) may be used to control the lighting device 1 by sending radiofrequency signals to the RF communication unit 7. The signals are first received by the metal strip 4, operating as an antenna, and then processed by the RF communication unit 7 which controls the driver 8 and the SSL element 2 in accordance with the received signal. Depending on the application, it may be possible to for example switch the lighting device 1 on and off, to dim the lighting device 1 and/or to change the color settings of the lighting device 1.

FIG. 4 shows a lighting device 100 which is similar to the one described above with reference to FIGS. 1 to 3 except in that the lighting device 100 is configured to communicate via a wired connection in addition to being configured to communicate wirelessly via the metal strip/antenna 4. The wired communication technology used by the lighting device 100 is in this example power-line communication (PLC), and by this technology the lighting device 100 is controllable by wire in a similar way to how it is controllable by wireless electromagnetic signals. The PLC technology is known per se and will therefore not be described in detail. In short, the lighting device 100 comprises an additional communication unit 11 which is arranged inside the base 9 and connected to the driver 8 and the RF communication unit 7. The additional communication unit 11 is also connected so as to be capable of receiving and/or sending signals over the power line 12 that powers the lighting device 100 during use.

Figure 5:
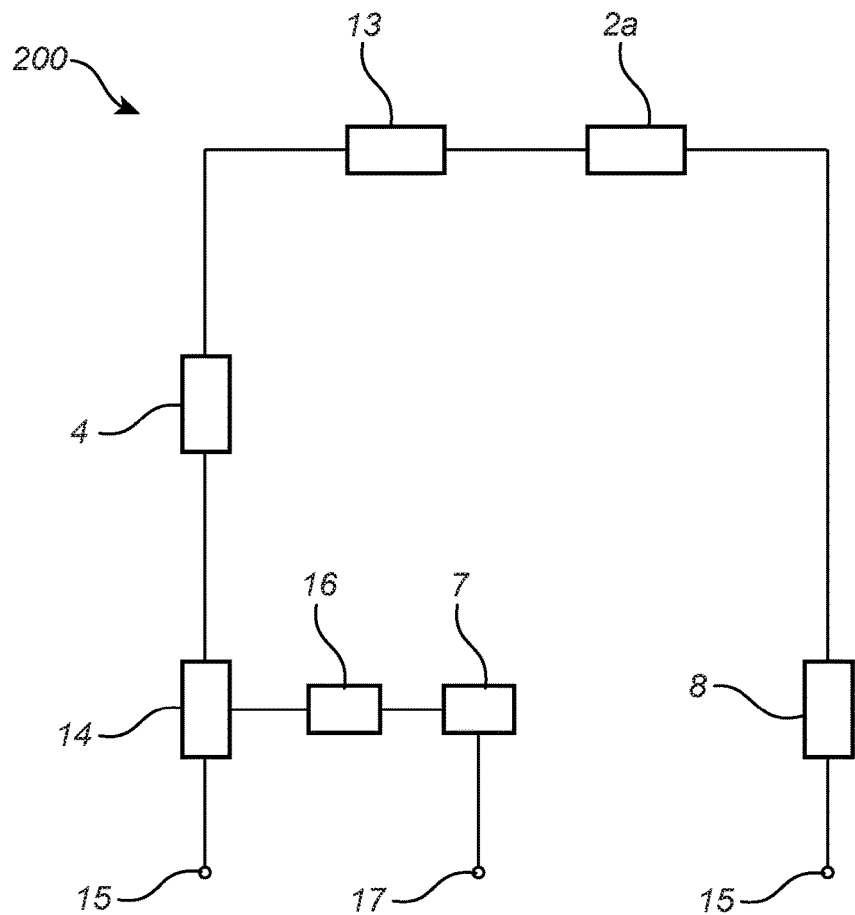
FIG. 5 shows a schematic block diagram of a lighting device according to a third embodiment of the invention.

FIG. 5 shows a lighting device 200 which is similar to the one described with reference to FIGS. 1 to 3 except in that the metal strip 4 and the circuit board 2b are integrated. The metal strip 4 may for example form part of an MCPCB arranged on the circumferential edge 3a of the light guide 3. The MCPCB should have many copper layers to reduce ohmic/thermal resistance. Alternatively, the LEDs 2a can be mounted on a metal strip 4 which is covered by a ceramic material, such as aluminium oxide.

The LEDs 2a are connected to the metal strip 4 via a first coil 13 mounted on the circuit board 2b. A second coil 14 connects the metal strip 4 to the DC ground 15. The second coil 14 may or may not be mounted on the circuit board 2b. The driver 8 is also connected to the DC ground 15. The impedances of the first and second coils 13, 14 are high enough to provide an open circuit for the RF signal frequencies of interest, such impedances typically being of the order of tens of microhenries. The impedance of the first coil 13 may or may not be the same as the impedance of the second coil 14. The RF communication unit 7 is connected to the metal strip 4 via a capacitor 16, more precisely a DC blocking capacitor, and to the RF ground 17. The capacitor 16 may be mounted on the circuit board 2b or integrated with the RF communication unit 7. The capacitance of the capacitor 16 is typically of the order of tens of picofarads.

In the lighting device 200, the first electrically isolating plate 6 of the lighting device 1 described with reference to FIGS. 1 to 3 is usually omitted, the first coil 13 having a similar function as that plate. Further, it may be noted that the metal strip 4 of the lighting device 200, in addition to operating as an antenna, serves as a return path for the driver current. The RF signal is superimposed on top of the DC signal powering the LEDs 2b. The person skilled in the art realizes that the present invention by no means is limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device comprising:
   a solid-state lighting element;
   a radio frequency communication unit for wireless communication between the lighting device and an external device;
   a light guide having a circumferential edge, wherein the light guide is adapted to couple in light emitted by the solid-state lighting element and to provide illumination to the surroundings of the lighting device, the solid-state lighting element being positioned in a depression of the circumferential edge; and
   a metal strip extending along at least a portion of the circumferential edge of the light guide, wherein the metal strip is in thermal contact with the solid-state lighting element and the light guide, and wherein the metal strip is coupled to the radio frequency communication unit so as to operate as an antenna for the radio frequency communication unit, the metal strip having two ends arranged on either side of the depression of the circumferential edge forming a gap level with the solid-state lighting element.

2. The lighting device according to claim 1, wherein the radio frequency communication unit is a transceiver.

3. The lighting device according to claim 1, wherein the metal strip is adapted to operate as an antenna for radiofrequency signals in the range from 2.4 Ghz to 2.5 Ghz.

4. The lighting device according to claim 1, wherein a side of the metal strip facing the light guide is reflective.

5. The lighting device according to claim 1, wherein the metal strip is perforated.

6. The lighting device according to claim 1, wherein the light guide has two oppositely arranged planar outer surfaces, the circumferential edge joining the respective circumferences of the two planar outer surfaces.

7. The lighting device according to claim 1, wherein the light guide is adapted to diffuse light emitted from the light guide.

8. The lighting device according to claim 1, further comprising a first electrically isolating plate arranged between the solid-state lighting element and the metal strip so as to electrically isolate the solid-state lighting element from the metal strip.

9. The lighting device according to claim 8, further comprising a base for mechanically and electrically connecting the lighting device.

10. The lighting device according to claim 9, further comprising a second electrically isolating plate arranged between the base and the metal strip so as to electrically isolate the base from the metal strip.

11. The lighting device according to claim 9, wherein the radio frequency communication unit is arranged inside the base.

12. The lighting device according to claim 9, further comprising a driver for powering the solid-state lighting element, wherein the driver is arranged inside the base.

13. The lighting device according to claim 1, further comprising an additional communication unit for wired communication between the lighting device and an external device.

14. The lighting device according to claim 1, wherein the solid-state lighting element comprises at least one light-emitting diode mounted on a circuit board, and wherein the metal strip is integrated with the circuit board.

* * * * *